United States Patent [19]

Gnyra

[11] 3,838,980
[45] Oct. 1, 1974

[54] PRECIPITATION OF BAYER ALUMINA TRIHYDRATE SUITABLE FOR THE MANUFACTURE OF CERAMIC GRADE ALUMINA OF IMPROVED GRINDABILITY

[75] Inventor: Bohdan Gnyra, Arvida Quebec, Canada

[73] Assignee: Alcan Research and Development Limited, Montreal, Quebec, Calif.

[22] Filed: Jan. 12, 1972

[21] Appl. No.: 217,246

[52] U.S. Cl. ................. 23/301 R, 23/305, 423/119, 423/121
[51] Int. Cl. ........................... B01d 9/02, C01f 7/14
[58] Field of Search .......... 23/301 R, 305; 423/119, 423/121

[56] References Cited
UNITED STATES PATENTS

| | | | |
|---|---|---|---|
| 2,247,624 | 7/1941 | Wall | 23/305 |
| 2,610,110 | 9/1952 | Eliasson | 23/305 |
| 2,657,978 | 11/1953 | Johnson | 23/301 |
| 2,707,669 | 5/1955 | Houston et al. | 23/305 |
| 2,876,068 | 3/1959 | Tertian | 23/301 |
| 2,935,376 | 5/1960 | Roberts | 23/301 |
| 3,265,466 | 8/1966 | Mollard | 23/301 |
| 3,607,140 | 9/1971 | Miller | 23/301 |
| 3,649,184 | 3/1972 | Featherston | 23/301 |
| 3,672,831 | 6/1972 | Duecker et al. | 23/305 |

Primary Examiner—Wilbur L. Bascomb Jr.
Assistant Examiner—R. T. Foster
Attorney, Agent, or Firm—Cooper, Dunham, Clark, Griffin & Moran

[57] ABSTRACT

Alpha alumina characterized by monocrystals of a small size, e.g. smaller than 5 microns, is produced from alumina trihydrate precipitated from pregnant Bayer solution by adding thereto alumina trihydrate seed crystals having a particle size such that at least 80-90 percent by weight of the seed crystals have a particle size smaller than 325 mesh. The seed crystals are added to the pregnant Bayer solution in a relatively large amount, such as an amount greater than 70 grams per liter. Desirably, the precipitation of the alumina trihydrate from the Bayer solution is carried out at a relatively high temperature, such as at a temperature in the range 165°-175°F. The resulting precipitated alumina trihydrate, characterized by a relatively low fluorine and residual soda ($Na_2O$) content, is separated and calcined, such as at a temperature of about 1,250°C. to produce an alpha alumina product characterized by monocrystals having a size smaller than about 5 microns. The resulting produced alpha alumina is readily reduced in size by grinding, such as by impact grinding or by ball milling, to produce a superior ceramic grade alumina.

6 Claims, No Drawings

PRECIPITATION OF BAYER ALUMINA TRIHYDRATE SUITABLE FOR THE MANUFACTURE OF CERAMIC GRADE ALUMINA OF IMPROVED GRINDABILITY

This invention relates to the production of alpha alumina, such as ceramic grade alpha alumina used in the manufacture of high power electric insulators. In accordance with one embodiment this invention is directed to the production of an alpha alumina characterized by particles of a very narrow size range, e.g., about 50 percent between 4 and 5 microns, about 40–45 percent between 5 and 10 microns and not more than about 5 percent by weight greater than 10 microns. In accordance with another embodiment this invention is directed to the production of alpha alumina which is relatively readily reduced to monocrystal size by impact grinding. In accordance with yet another embodiment this invention is directed to the production of alumina trihydrate having a relatively small crystal size and further characterized by a relatively low impurity content, such as a relatively low fluorine content and a relatively low residual soda ($Na_2O$) content.

Many techniques and processes are known and employed for the production of alumina trihydrate and alumina, see U.S. Pat. Nos. 2,549,549, 2,707,669, 2,935,376, 3,201,199 and 3,545,923. The disclosures of these patents are herein incorporated and made part of this dislosure.

In the production of ceramic grade alpha alumina such as by subjecting calcined alpha alumina to size reduction, as by impact grinding, it is possible only to reduce the alpha alumina to a particle size determined by its monocrystal size. Alpha alumina having a relatively large proportion of monocrystals having a size greater than about 5–10 microns, particularly greater than 10 microns, usually results in an off-specification final ceramic grade alpha alumina product because of a too large proportion or percentage of alpha alumina having a particle size greater than 5–10 microns. In the situation wherein the calcined alpha alumina is made up of a substantial amount of monocrystals having a size greater than 5–10 microns, it is necessary to grind the alumina longer and harder so as to achieve the specification particle size for ceramic grade alumina. For example, in the production of ceramic grade alpha alumina from calcined alumina made up of a substantial proportion of monocrystals having a size greater than 5 microns it is necessary to more intensively grind the alpha alumina, such as at a rate of about 2–3 tons per hour, in order to reach ceramic grade specification alpha alumina. When, however, the calcined alpha alumina is made up of alpha alumina having a monocrystal size not greater than about 5 microns, e.g., at least 50 percent by weight having a monocrystal size less than 5 microns, less intensive grinding is necessary to effect size reduction to reach the desired ceramic grade alpha alumina specification. By way of example, a calcined alpha alumina made up of alpha alumina monocrystals having a size less than about 5 microns can be reduced to ceramic grade particle size at a rate of about 5 tons per hour with substantially the same grinding conditions and equipment as employed hereinabove to produce 2–3 tons per hour starting with a calcined alpha alumina having a larger monocrystal size. Accordingly, from the point of view of productivity alone it is desirable to produce a calcined alpha alumina made up of aggregates of alpha alumina having a monocrystal size of below about or not greater than about 5 microns.

Accordingly, it is an object of this invention to provide an improved process for the production of a calcined alpha alumina.

It is another object of this invention to provide a process for the production of a calcined alpha alumina made up of a substantial amount of aggregates of alpha alumina having a size not greater than about 10 microns.

It is another object of this invention to provide a process for the production of alumina trihydrate particularly useful for the production of calcined alpha alumina.

It is another object of this invention to provide a process for the precipitation and production of alumina trihydrate characterized by a relatively low impurity content, such as a low fluorine content and a relatively low residual soda ($Na_2O$) content.

How these and other objects of this invention are achieved will become apparent in the light of the accompanying disclosure. In at least one embodiment of the practices of this invention at least one of the foregoing objects will be achieved.

In the production of alumina trihydrate via the Bayer process bauxite is digested in an aqueous caustic (NaOH) solution. Alumina trihydrate is precipitated from the resulting filtered Bayer pregnant liquor by the addition of seed alumina trihydrate crystals which act as a precipitating agent for the precipitation of the alumina trihydrate.

In accordance with this invention it has been discovered that the size of the added seed alumina trihydrate crystals employed as the precipitating agent for the precipitation of alumina trihydrate from a pregnant Bayer liquor serves to determine the crystal size of the resulting precipitated alumina trihydrate. Specifically, it has been discovered that when the alumina trihydrate seed crystals employed to precipitate alumina trihydrate from pregnant Bayer liquor possesses a relatively small particle size the resulting precipitated alumina trihydrate also tends to be precipitated in the form of relatively small alumina trihydrate crystals. Additionally, it has been discovered in accordance with this invention that when a relatively small or finely divided seed alumina trihydrate crystal is employed to precipitate alumina trihydrate from pregnant Bayer liquor the resulting precipitated alumina trihydrate not only possesses a corresponding small particle or crystal size but furthermore the resulting precipitated alumina trihydrate has a relatively reduced impurity content, such as a relatively reduced residual soda content ($Na_2O$) and fluorine (F) content. Furthermore, it has been discovered that the resulting precipitated alumina trihydrate upon calcining produces a calcined alpha alumina product characterized by monocrystals having a relatively small size, such as below about 5 microns. Accordingly, the resulting precipitated alumina trihydrate when calcined to produce a calcined alpha alumina product yields a calcined alpha alumina product which can be readily reduced to a smaller average particle size, as determined by the size of the alpha alumina monocrystals making up the calcined alpha alumina, with the result that specification ceramic grade alpha alumina can more readily be obtained.

By way of example, it has been discovered that when a greater than usual amount of alumina trihydrate seed crystals having a smaller than usual particle or crystal size, such as an amount of seed alumina trihydrate crystals above about 60–70 grams per liter, such as an amount in the range 70-150 grams per liter, e.g., about 100 grams per liter, as opposed to the conventional amount of about 30–40 grams per liter, is added to pregnant Bayer liquor, the added seed alumina trihydrate crystals having a particle size such that 80–90 percent by weight has a particle size smaller than 325 mesh, the resulting precipitated alumina trihydrate contains relatively less residual $Na_2O$ and therefore less impurities as compared with similarly precipitated alumina trihydrate wherein a coarser or larger size seed alumina trihydrate crystal was employed as the precipitating agent for the same pregnant Bayer liquor.

It has been determined that when fine, i.e., 80–90 percent by weight smaller than 325 mesh, alumina trihydrate seed crystals are employed to precipitate alumina trihydrate from pregnant Bayer liquor the resulting precipitated alumina trihydrate has a soda content measured as $Na_2O$ in the range 0.3–0.4 percent by weight and a fluorine content in the range 0.010–0.03 percent by weight as compared with a similarly precipitated alumina trihydrate which has been precipitated by the addition to the same Bayer pregnant liquor of seed alumina trihydrate having a substantially larger crystal size, resulting in a precipitated alumina trihydrate having a soda content in the range 0.45–0.55 percent and a fluorine content of 0.035 percent. Accordingly, from the same pregnant liquor it is not only possible to precipitate a smaller or finer crystal size precipitated alumina trihydrate but also to precipitate an alumina trihydrate having a lower impurity content, i.e., a reduced residual soda and fluorine content. This is achieved by employing as the seed alumina trihydrate crystals alumina trihydrate crystals having a fine particle size, i.e. at least 80–90 percent by weight smaller than 325 mesh and by the addition of these finer seed alumina trihydrate crystals to the pregnant Bayer liquor in an amount greater than 70 grams per liter (gp l).

The resulting fine particle size alumina trihydrate precipitated from the Bayer pregnant liquor in accordance with the practices of this invention upon calcining, such as at a temperature in the range about 1,100°–1,300°C., e.g., a temperature of about 1,250°C., yields a calcined alumina product made up of aggregates of relatively small monocrystals of alpha alumina having a size of about 5 microns. The resulting calcined alpha alumina product made up of these small monocrystals of alpha alumina is readily easily ground, such as by impact grinding, such as in a Majac Mill wherein a jet of an air-alumina mixture is directed against a metal plate and the alumina broken down to a particle size largely determined by its monocrystal size.

The following examples are illustrative of the practices of this invention in connection with the production of a calcined alpha alumina product made up of aggregates of alpha alumina monocrystals having a size smaller than about 5 microns.

EXAMPLE NO. 1

Two separate alumina trihydrate products were precipitated from the same Bayer pregnant liquor by employing the same finely divided alumina trihydrate seed crystals, i.e., alumina trihydrate seed crystals having a particle size such that 85 percent by weight of the seed crystals are smaller than 325 mesh. One precipitated alumina trihydrate product, Product No. 1, was precipitated from the Bayer pregnant liquor by the addition thereto of 25 grams per liter of the seed alumina trihydrate at a temperature of 145°F. and the other alumina trihydrate product, Product No. 2, was precipitated from the Bayer pregnant liquor by the addition thereto of 70 grams per liter seed alumina trihydrate at a temperature of 160°F.

The precipitation of the alumina trihydrate product was carried out over a period of about 24 hours for each product. In each instance the resulting precipitated alumina trihydrate products were separated, washed and dried. Alumina trihydrate Product No. 1 contained 1.5 percent by weight alumina trihydrate crystals having a particle size smaller than 325 mesh and had a residual soda ($Na_2O$) content of 0.710 percent by weight and a fluorine content of 0.045 percent by weight. Alumina trihydrate Product No. 2, however, produced by precipitation at a temperature of 160°F., upon the addition of a larger seed charge, i.e., 70 grams per liter, yielded an alumina trihydrate product which contained 9.6 percent by weight alumina trihydrate crystals having a particle size smaller than 325 mesh and which had a substantially reduced impurity content, specifically 0.42 pecent by weight soda and 0.025 percent fluorine.

Both alumina trihydrate products were calcined at a temperature of 1,250°C. for 2 hours with 0.1 percent by weight aluminum trifluoride ($AlF_3$) added as mineralizer. Upon cooling samples of the resulting produced calcined alpha aluminas were placed on glass slides, each in two drops of oil. The respective samples of the calcined alpha alumina were pressed to liberate the alpha alumina monocrystals. Microscope examination revealed that the alpha alumina monocrystals produced from the alumina trihydrate Product No. 1 were about twice as large as those produced from the alumina trihydrate Product No. 2.

EXAMPLE NO. 2

Other experiments were carried out and these experiments indicated that there was a vast difference in the size of the alpha alumina monocrystals obtained under identical calcining conditions, e.g. at 1,250°C. for about 2 hours in the presence of 0.1 percent by weight added ($AlF_3$) mineralizer from alumina trihydrate precipitated from pregnant Bayer solution by the addition thereto of coarse, relatively large size alumina trihydrate seed crystals and from similarly precipitated alumina trihydrate employing alumina trihydrate seed crystals having a particle size smaller than 325 mesh.

EXAMPLE NO. 3

In an actual plant production run it was observed that a coarser and more difficult to grind calcined alumina resulted from an alumina trihydrate which had been precipitated by means of coarse, fairly large size alumina trihydrate seed crystals as compared with a finer and easier to grind alumina derived from alumina trihydrate which had been precipitated by the addition of finely divided alumina trihydrate seed crystals, e.g., alumina trihydrate seed crystals having a particle size about 80–90 percent by weight smaller than 325 mesh.

It has been determined that the advantages of the practices of this invention, i.e., the precipitation of alumina trihydrate having a lower residual soda content and fluorine content as compared with alumina trihydrate precipitated under standard conditions, are obtained by adding to the pregnant Bayer liquor relatively large amounts of alumina trihydrate seed crystals, for example, an amount above about 60–70 grams per liter, and by the addition of seed crystals having a smaller than usual crystal size, e.g., alumina trihydrate seed crystals having a particle size such that 80–90 percent by weight are smaller than 325 mesh. It is advantageous in the practices of this invention to carry out the alumina trihydrate precipitation operation at a relatively high precipitation temperature, e.g., above 145°F., such as a temperature in the range from about 160°F. to about 175°F., more or less. The advantages of this invention are also obtainable when the precipitation operation is carried out at a relatively low temperature, such as about 145°F., more or less.

It is also advantageous in the practices of this invention in the precipitation of alumina trihydrate to employ a pregnant Bayer liquor having a low ratio and a low caustic content although the advantages of the practices of this invention are also obtainable when a high ratio Bayer liquor is employed. Specifically, in the practice of this invention it is advantageous to employ a pregnant Bayer liquor having a caustic concentration below 160 grams per liter caustic measured as $Na_2CO_3$. It is also advantageous in the practices of this invention to employ a pregnant Bayer liquor having a ratio, measured as the ratio of the grams per liter alumina in solution to the grams per liter caustic soda measured as $Na_2CO_3$ in solution, below about 0.640.

In the practices of this invention there would be produced an alumina trihydrate product of improved purity by employing a low caustic Bayer pregnant liquor and a low ratio Bayer pregnant liquor as well as by carrying out the precipitation of the alumina trihydrate at a relatively elevated temperature, such as a temperature above 160°–165°F. For example, by employing a relatively high precipitating temperature of above about 160°F. and a pregnant Bayer liquor having a low $Al_2O_3$ to caustic ratio such as in the range 0.600–0.620, it would be expected that the resulting precipitated alumina trihydrate would have a 0.1 percent lower $Na_2O$ content than an alumina trihydrate which had been precipitated at a temperature of about 145°F. from a pregnant Bayer liquor having a ratio of about 0.650. Accordingly, not only do the chemical and physical conditions of the Bayer pregnant liquor determine the level of the residual $Na_2O$ in the precipitated alumina trihydrate but also, as indicated hereinabove, the amount and/or particle size of the added seed alumina trihydrate plays an important part. Specifically, it has been found that by using relatively high seed charges of finely divided seed alumina trihydrate, such as an amount above 60 grams per liter seed alumina trihydrate, the resulting precipitated alumina trihydrate contains about 0.1 percent lower residual $Na_2O$ even when precipitated at a relatively low temperature of about 145° F. and from a relatively high ratio pregnant Bayer liquor of about 0.640.

The advantages of the practices of this invention are demonstrated in the data presented in accompanying Example No. 4.

EXAMPLE NO. 4

Precipitation of alumina trihydrate from pregnant Bayer liquor having a caustic concentration of 185 grams per liter and a ratio of 0.640 was carried out. The precipitation of the alumina trihydrate was effected by the addition thereto of fine seed alumina trihydrate, about 85–90 percent by weight, having a particle size smaller than 325 mesh. The results of these tests are set forth in accompanying Table I and Table II:

TABLE I

PRECIPITATION OF ALUMINA TRIHYDRATE IN BAYER LIQUOR OF 185 GPL CAUSTIC AND .640 RATIO SEEDED WITH FINE BAYER SEED, 24-HR. CYCLE, AT 145° AND 160°F.
($Na_2O$ in the seed: 0.31%)

| Sample | Temp. of Precipitation °F. | Seed Charge (gpl) | Product Analysis | | |
|---|---|---|---|---|---|
| | | | % -325 mesh Fraction | % $Na_2O$ (Residual) | % F |
| 1 | 145 | 25 | 1.2% | 0.71 | 0.045 |
| 2 | 145 | 25 | 1.6% | 0.77 | 0.050 |
| 3 | 145 | 70 | 11.2% | 0.61 | 0.040 |
| 4 | 160 | 25 | 0.8% | 0.56 | 0.040 |
| 5 | 160 | 70 | 9.6% | 0.42 | 0.025 |
| 6 | 160 | 70 | 8.8% | 0.45 | 0.030 |

TABLE II

PRECIPITATION OF ALUMINA TRIHYDRATE IN BAYER LIQUOR OF 185 GPL CAUSTIC AND 0.635 RATIO SEEDED WITH FINE BAYER SEED, 24-HR. CYCLE, AT 150°F.
($Na_2O$ in the Seed: 0.31%)

| Sample | Seed Charge (gms) | Total Product (gms) | % $Na_2O$ (Residual) |
|---|---|---|---|
| 1 | 25 | 88.0 | 0.67 |
| 2 | 25 | 87.4 | 0.67 |
| 3 | 60 | 133.4 | 0.53 |
| 4 | 60 | 133.0 | 0.54 |
| 5 | 90 | 167.8 | 0.50 |
| 6 | 90 | 167.9 | 0.50 |

EXAMPLE NO. 5

In an industrial application of the practices of this invention about 200 tons of relatively fine alumina trihydrate were precipitated at a starting temperature of 155°F. employing 70 gpl of fine Bayer seed (alumina trihydrate) having a particle size such that about 85 percent was smaller than 325 mesh. The resulting precipitated alumina trihydrate was then classified into coarser and finer fractions, washed and calcined in a rotary kiln under standard conditions, ground in a high velocity impact type mill and analyzed. The results are set forth in accompanying Table III:

TABLE III

PRODUCTION OF GROUND α-Al₂O₃ FROM COARSER AND FINER FRACTIONS OF A GIVEN ALUMINA TRIHYDRATE

| Feed to the Kiln | | | Grinding Rate | Product Size (%) | | Product Surface area |
|---|---|---|---|---|---|---|
| Sample | % −325 mesh | % Na₂O | % F | (tons/hr) | +10μ | −10 +5μ | (cm²/gm) |
| 1 | 11.6 | 0.28 | 0.024 | 3.0 | 10.2 | 45 | 4900 |
| 2 | 14.8 | — | — | 3.0 | — | — | 4900 |
| 3 | 17.6 | 0.28 | 0.024 | 2.7 | 10.1 | 46 | 5100 |
| 4 | 16.4 | — | — | 2.7 | — | — | 5100 |
| 5 | 16.4 | 0.28 | — | 2.7 | 6.6 | 45 | 5100 |
| 6 | 22.0 | — | — | 3.3 | — | — | 5500 |
| 7 | 24.0 | 0.25 | 0.020 | 3.9 | 5.0 | 37 | 5600 |
| 8 | 25.2 | — | — | 4.3 | — | — | 5500 |
| 9 | 28.4 | 0.25 | 0.020 | 4.5 | 6.9 | 41 | 5300 |
| 10 | 28.3 | — | — | 4.7 | 7.1 | — | — |

It will be seen from Table III that as the feed to the kiln started to change from a relatively coarse size of about 11–16 percent -325 mesh to a fine size of about 22–28 percent -325 mesh the resulting ground alpha alumina was first relatively coarse (about 45 percent −10 +5μ and 4,900–5,100 cm²/gm of specific surface area) and then became finer (about 37–41 percent −10 +5μ and about 5,500 cm²/gm of specific surface area). Most important it should be noted that the relatively coarse alpha alumina required a very hard grinding, yielding a product at a rate of 2.7–3.0 tons per hour whereas the finer alpha alumina ground easily and yielded a product at a rate of 4.0–4.7 tons per hour.

As will be apparent to those skilled in the art in the light of the foregoing disclosure, many modifications, alterations and substitutions are possible in the practice of this invention without departing from the spirit or scope thereof.

I claim:

1. The method of producing calcined alpha alumina of controlled small particle size, the alpha alumina being characterized by relatively small monocrystals, which comprises adding seed alumina trihydrate crystals to pregnant Bayer solution having a caustic concentration between about 160 and about 190 grams per liter caustic measured as Na₂CO₃ to precipitate alumina trihydrate from said Bayer solution, the amount of said alumina trihydrate added to said Bayer solution being in the range from about 70 to about 100 grams per liter based on said Bayer solution, said seed alumina trihydrate crystals having a particle size such that at least 80 percent by weight is smaller than 325 mesh, the addition of said alumina trihydrate crystals and the precipitation of said alumina trihydrate from said Bayer solution being carried out at a temperature in the range from about 160°F. to about 175°F., separating the resulting precipitated alumina trihydrate and calcining the separated alumina trihydrate to produce an alpha alumina product made up of aggregates of alpha alumina monocrystals such that the resulting calcined alpha alumina product is made up of at least about 50 percent by weight alpha alumina having a monocrystal size less than 5 microns.

2. In the operation in accordance with claim 1 wherein the precipitated and separated alumina trihydrate is calcined at an elevated temperature above about 1,100°–1,300°C.

3. In the operation in accordance with claim 1 wherein the calcining of said precipitated and separated alumina trihydrate is carried out in the presence of about 0.1 percent by weight aluminum trifluoride (AlF₃) added as mineralizer, said percent by weight being based on the weight of alumina trihydrate.

4. In the operation in accordance with claim 1 wherein said pregnant Bayer solution has a ratio measured as the ratio of the grams per liter alumina measured as Al₂O₃ in solution to the grams per liter caustic soda measured as Na₂CO₃ in solution below about 0.640.

5. The method of producing alpha alumina of controlled small particle size, the alpha alumina being characterized by relatively small monocrystals, which comprises adding seed alumina trihydrate crystals to pregnant Bayer solution having a caustic concentration between about 160 and about 190 grams per liter caustic measured as Na₂CO₃ to precipitate alumina trihydrate from said Bayer solution, the amount of said alumina trihydrate crystals added to said Bayer solution being in the range from about 70 to about 100 grams per liter based on said Bayer solution, said seed alumina trihydrate crystals having a particle size such that at least 80 percent by weight is smaller than 325 mesh, the addition of said seed alumina trihydrate crystals and the precipitation of said alumina trihydrate from said Bayer solution being carried out at a temperature in the range from about 160°F. to about 175°F. and for a period of time of at least about 20 hours, said Bayer solution to which said seed alumina trihydrate crystals are added having a ratio measured as the ratio of the grams per liter alumina measured as Al₂O₃ in solution to the grams per liter caustic soda measured as Na₂CO₃ in solution below about 0.640, separating the resulting precipitated alumina trihydrate, calcining the resulting separated alumina trihydrate at a temperature above about 1,200°C. for at least one hour to produce an alpha alumina product made up of aggregates of alpha alumina monocrystals such that at least 50 percent by weight of the alpha alumina product is made up of alpa alumina having a monocrystal size less than 5 microns.

6. The method in accordance with claim 5 wherein said aggregates of alpha alumina monocrystals are subjected to size reduction to produce an alpha alumina product having a particle size such that not more than 5 percent by weight of the resulting produced alpha alumina has a particle size greater than 10 microns.

* * * * *

UNITED STATES PATENT OFFICE
CERTIFICATE OF CORRECTION

Patent No. 3,838,980        Dated October 1, 1974

Inventor(s) Bohdan Gnyra

It is certified that error appears in the above-identified patent and that said Letters Patent are hereby corrected as shown below:

Assignee's address should correctly read:

-- Alcan Research and Development Limited
Montreal, Quebec, Canada ---

Col. 8, line 60, "alpa" second occurrence should read -- alpha --

Signed and sealed this 7th day of January 1975.

(SEAL)
Attest:

McCOY M. GIBSON JR.
Attesting Officer

C. MARSHALL DANN
Commissioner of Patents